(12) United States Patent
Stroh et al.

(10) Patent No.: US 9,683,508 B2
(45) Date of Patent: Jun. 20, 2017

(54) ENGINE CONTROL SYSTEMS AND METHODS

(71) Applicant: Cummins Inc., Columbus, IN (US)

(72) Inventors: David Stroh, Columbus, IN (US); Govindarajan Kothandaraman, Columbus, IN (US); Carlos Alcides Lana, Columbus, IN (US); Karim A. Azizou, Richmond (CA)

(73) Assignee: Cummins Inc., Columbus, IN (US)

( * ) Notice: Subject to any disclaimer, the term of this patent is extended or adjusted under 35 U.S.C. 154(b) by 0 days.

(21) Appl. No.: 14/959,232

(22) Filed: Dec. 4, 2015

(65) Prior Publication Data

US 2016/0084187 A1    Mar. 24, 2016

Related U.S. Application Data

(63) Continuation of application No. 14/628,552, filed on Feb. 23, 2015, now Pat. No. 9,228,510, which is a continuation of application No. PCT/US2013/056302, filed on Aug. 22, 2013, which is a continuation-in-part of application No.
(Continued)

(51) Int. Cl.
| | |
|---|---|
| *B60T 7/12* | (2006.01) |
| *F02D 41/24* | (2006.01) |
| *F02D 41/00* | (2006.01) |
| *F02P 5/04* | (2006.01) |
| *F02D 41/14* | (2006.01) |
| *F02D 41/34* | (2006.01) |

(52) U.S. Cl.
CPC ..... *F02D 41/2496* (2013.01); *F02D 41/0002* (2013.01); *F02D 41/1497* (2013.01); *F02P 5/045* (2013.01); *F02D 41/345* (2013.01); *F02D 2250/18* (2013.01); *F02D 2250/21* (2013.01); *F02D 2250/22* (2013.01); *Y02T 10/42* (2013.01)

(58) Field of Classification Search
CPC .................. F02D 41/0002; F02D 41/1497
USPC .................. 701/103, 104; 123/679, 681, 434, 123/406.23, 406.24
See application file for complete search history.

(56) References Cited

U.S. PATENT DOCUMENTS

| | | | |
|---|---|---|---|
| 5,687,692 A * | 11/1997 | Togai | .................. F02D 41/1498 123/436 |
| 6,073,619 A | 6/2000 | Baranowski | |

(Continued)

FOREIGN PATENT DOCUMENTS

| | | |
|---|---|---|
| CN | 101046176 | 10/2007 |
| CN | 101784779 | 12/2012 |

(Continued)

OTHER PUBLICATIONS

PCT/US2013/056302, International Search Report and Written Opinion, Jan. 1, 2014, 8 pages.

(Continued)

*Primary Examiner* — John Kwon
(74) *Attorney, Agent, or Firm* — Taft Stettinius & Hollister LLP

(57) ABSTRACT

A system comprising an air actuator configured to control air delivered to an engine; a fuel actuator configured to control fuel delivered to an engine; and a controller configured to: actuate the air actuator in response to a first torque signal; and actuate the fuel actuator in response to a second torque signal.

7 Claims, 6 Drawing Sheets

Related U.S. Application Data

13/591,590, filed on Aug. 22, 2012, now Pat. No. 9,115,664.

(56) References Cited

U.S. PATENT DOCUMENTS

| | | | |
|---|---|---|---|
| 6,209,519 B1 | 4/2001 | Melchior et al. | |
| 6,263,860 B1 | 7/2001 | Firey | |
| 6,278,933 B1 | 8/2001 | Buckland et al. | |
| 6,295,965 B1 | 10/2001 | Firey | |
| 6,457,309 B1 | 10/2002 | Firey | |
| 6,499,456 B1* | 12/2002 | Nogi | F02B 1/12 123/295 |
| 6,712,042 B1 | 3/2004 | Kustosch | |
| 7,305,997 B2 | 12/2007 | Liu et al. | |
| 7,311,079 B2* | 12/2007 | Surnilla | F02P 5/1504 123/324 |
| 7,509,209 B2 | 3/2009 | Davis et al. | |
| 7,567,866 B2 | 7/2009 | Kokubu | |
| 9,115,664 B2 | 8/2015 | Stroh et al. | |
| 2003/0209235 A1* | 11/2003 | Javaherian | F02D 41/0085 123/674 |
| 2006/0030998 A1* | 2/2006 | Surnilla | F02P 5/1504 701/112 |
| 2008/0125951 A1 | 5/2008 | Livshiz et al. | |
| 2008/0147300 A1 | 6/2008 | Kakuya et al. | |
| 2008/0294325 A1 | 11/2008 | Kurotani et al. | |
| 2009/0229565 A1 | 9/2009 | Kang et al. | |
| 2010/0057325 A1 | 3/2010 | Livshiz et al. | |
| 2010/0198485 A1 | 8/2010 | Ohtsuka et al. | |
| 2011/0100323 A1 | 5/2011 | Bradley et al. | |
| 2011/0139117 A1 | 6/2011 | Kar et al. | |
| 2012/0035834 A1 | 2/2012 | Takahashi | |
| 2014/0058645 A1* | 2/2014 | Stroh | F02D 41/26 701/103 |

FOREIGN PATENT DOCUMENTS

| | | |
|---|---|---|
| CN | 102213153 | 8/2016 |
| GB | 2024462 A | 1/1980 |
| WO | 2006036265 A2 | 4/2006 |

OTHER PUBLICATIONS

Chinese Office Action, Chinese Application No. 2013800494880, dated Oct. 27, 2016, the claims examined were the claims filed in the corresponding PCT Appln., Appln. No. PCT/US13/56302, claimes 1-24, 3 pgs.

* cited by examiner

ENGINE CONTROL SYSTEMS AND METHODS

RELATED APPLICATIONS

The present application is a continuation of U.S. patent application Ser. No. 14/628,552 filed on Feb. 23, 2015, which is a continuation of International Application No. PCT/US2013/056302 filed on Aug. 22, 2013, which claims priority to, and is a continuation-in-part of, U.S. patent application Ser. No. 13/591,590 entitled "ENGINE CONTROL SYSTEMS AND METHODS" and filed on Aug. 22, 2012, and now issued as U.S. Pat. No. 9,115,664 on Aug. 25, 2015, each of which is incorporated herein by reference in its entirety for all purposes.

BACKGROUND

The technical field generally relates to engine control systems diagnostics and, in particular, to engine control systems using torque actuation.

Spark ignited (SI) engines can be controlled differently than compression ignited (CI) engines. For example, SI engines typically attempt to maintain a stoichiometric air to fuel ratio (AFR). Torque from an SI engine is primarily controlled through control of air. In contrast, the AFR for CI engines can vary from the stoichiometric AFR. Accordingly, fuel can be controlled independent of air, introducing a control not available on homogenous charge SI engines. Furthermore, gasoline direct injection (GDI) SI engines can be operated with stratified charges, i.e. with varying AFR. Thus, the control of torque can vary based on engine structure.

Therefore, further technological developments are desirable in this area.

SUMMARY

One embodiment is a unique system comprising an air actuator configured to control air delivered to an engine; a fuel actuator configured to control fuel delivered to an engine; and a controller configured to: actuate the air actuator in response to a first torque signal; and actuate the fuel actuator in response to a second torque signal.

Other embodiments include unique methods and systems to control engines of different types. Further embodiments, forms, objects, features, advantages, aspects, and benefits shall become apparent from the following description and drawings.

DESCRIPTION OF THE ILLUSTRATIVE EMBODIMENTS

Figure 1:
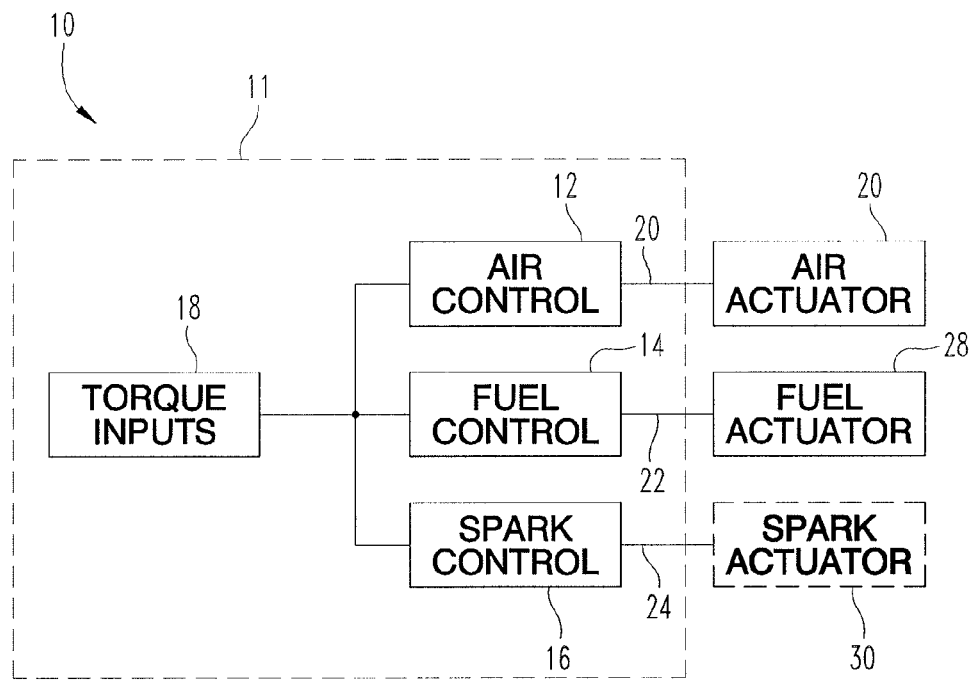
FIG. 1 is a block diagram of a torque based engine control system according to an embodiment.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

In an embodiment, engine systems having different architectures can be controlled by a common torque control technique. That is, a common technique can be applied to spark ignited (SI) engines, gasoline direct injection (GDI) engines, compression ignited (CI) engines, or other similar engines based on fuel and air. As will be described in further detail below, in an embodiment, a torque based interface can provide a transformation from the torque input to appropriate fuel, air, and other parameters for a particular engine architecture.

The controls, systems, and procedures described herein allow a single control scheme to control engine torque for a stoichiometric engine and/or for a lean burning engine, either within the same engine at different operating times or for distinct engines with only a calibration difference between the engines rather than a fundamental controller difference.

Certain elements described herein are depicted and/or presented as a controller or controller element. A controller forms a portion of a processing subsystem including one or more computing devices having memory, processing, and communication hardware. The controller may be a single device or a distributed device, and the functions of the controller may be performed by hardware and/or as computer instructions on a non-transient computer readable storage medium.

In certain embodiments, a controller includes one or more modules, and/or one or more separately described control elements. The modules and/or separately described control elements are structured to functionally execute the operations of the controller. The description herein including modules and/or individually described control elements emphasizes the structural independence of the aspects of the controller, and illustrates one grouping of operations and responsibilities of the controller. Other groupings that execute similar overall operations are understood within the scope of the present application. Modules and/or control elements may be implemented in hardware and/or as computer instructions on a non-transient computer readable storage medium. Modules and/or control elements may be distributed across various hardware or computer based components.

Example and non-limiting module or controller elements implementation examples include sensors providing any value determined herein, sensors providing any value that is a precursor to a value determined herein, datalink and/or network hardware including communication chips, oscillating crystals, communication links, cables, twisted pair wiring, coaxial wiring, shielded wiring, transmitters, receivers, and/or transceivers, logic circuits, hard-wired logic circuits, reconfigurable logic circuits in a particular non-transient state configured according to the module or control element specification, any actuator including at least an electrical, hydraulic, or pneumatic actuator, a solenoid, an op-amp, analog control elements (springs, filters, integrators, adders, dividers, gain elements), and/or digital control elements.

Certain operations described herein include operations to interpret one or more parameters. Interpreting, as utilized herein, includes receiving values by any method known in the art, including at least receiving values from a datalink or network communication, receiving an electronic signal (e.g. a voltage, frequency, current, or PWM signal) indicative of the value, receiving a computer generated parameter indicative of the value, reading the value from a memory location on a non-transient computer readable storage medium, receiving the value as a run-time parameter by any means known in the art, and/or by receiving a value by which the interpreted parameter can be calculated, and/or by referencing a default value that is interpreted to be the parameter value.

Where values are described explicitly or implicitly as input elements to a controller, the values may be determined by any method understood in the art. Input values may be taken from sensor values, calculated from sensor values, and/or provided to the system as readable values stored on a non-transient computer readable medium. In certain embodiments, a value may be determined from a virtual sensor or other calculation based on other values. In certain embodiments, the source of a given value may vary with time, for example and not limited to value sources changing in response to system conditions, a sensor or other fault occurrence, a reliability estimate of a value, or any other control management operation as will be understood in the art.

FIG. 1 is a block diagram of a torque based engine control system according to an embodiment. In this embodiment the engine control system 10 includes a controller 11. The controller is configured to provide air control 12, fuel control 14, and spark control 16. The controls 12, 14, and 16 can be responsive to one or more torque inputs 18.

The controller 11 can be coupled to various actuators. An air actuator 26, a fuel actuator 28, and a spark actuator 30 are illustrated. However, other actuators can be present.

The air control 12 can be configured to generate an air control signal 20. The air actuator 26 can be configured to control delivery of air to an engine in response to the air control signal 20. For example, the air actuator 26 can be an electronic throttle. Any device coupled to a compressor, throttle, intake manifold, or the like can be the air actuator 26 or part of the air actuator 26, and can be responsive to the air control signal 20.

Similarly, the fuel control 14 can be configured to generate a fuel control signal 22. The fuel actuator 28 can be configured to control delivery of fuel to the engine in response to the fuel control signal 22. For example, the fuel actuator 28 can include fuel injectors, fuel pumps, other fuel system components, or the like.

The spark actuator 30 can be configured to control ignition in an engine in response to the spark control signal 24. For example, the spark actuator 30 can be an electronic ignition system configured to actuate spark plugs. Although spark plugs as part of a spark actuator 30 as been used as an example, any device that can affect a timing, sequence, or the like of an ignition can be part of the spark actuator 30 and can be responsive to the spark control signal 24.

The spark actuator 30 is illustrated in phantom. In particular, the spark actuator 30 can be present in an SI engine. However, a spark actuator 30 may not be present in a CI engine. In an embodiment, the spark control 16 functionality can still be present in the controller 11 for a CI engine, yet a connection to a spark actuator 30 is not made as it is not present for the CI engine. That is, the same controller 11 and/or functionality implemented by the controller can be used between SI and CI engines.

In an embodiment, the controller 11 can be configured to respond to a variety of torque inputs 18. For example, the torque inputs 18 can represent an instantaneous torque and a longer-term torque. The instantaneous torque can be a desired torque on a time scale of a cylinder event, such as a power stroke of a piston, a complete cycle of a cylinder, or the like.

The longer-term torque can represent a desired torque over a longer time scale. For example, a threshold for a longer-term torque can include multiple cylinder cycles. In an embodiment, the number of cycles can be on the order of a number of cylinders of an engine, such as 4, 6, 8, 10, 12, or the like. In another embodiment, the division between instantaneous torque and longer-term torque can be substantially independent of cylinder cycles. For example, the division can be based on a propagation delay time for an air control system including the air actuator 26.

In an embodiment, torque generated in response to an air actuator 26 can have a slower response than torque generated by a fuel actuator 28. Accordingly, two torque signals can be used. As will be described in further detail below, an air actuator can be actuated in response to a first torque signal and a fuel actuator can be actuated in response to a second torque signal. The longer-term torque signal and the instantaneous torque signal can be the first and second torque signals. That is, the air actuator can be actuated in response to the longer-term torque signal and the fuel actuator can be actuated in response to the instantaneous torque signal; however, in other embodiments, the various actuators 26, 28, and 30 can be responsive to different torque signals, combinations of such torque signals, or the like.

The torque signals 18 can be generated from a variety of sources. For example, longer-term torque signals can be generated by a user, a cruise-control system, an idle-control system, or the like. Any system that may change on a time scale on the order of or greater than a response time of an air control system can provide part or the entire longer-term torque signal. Similarly, control systems that change at a faster rate, such as a transmission control system, or the like, can contribute to the instantaneous torque signal. Although a responsiveness of an air control system has been used as a threshold, a division between contributors to the torque signals can be selected as desired to apportion contributions to the air control 12, fuel control 14, spark control 16, or the like.

Furthermore, any number of torque inputs 18 can be used. For example, each of the air actuator 26, fuel actuator 28, and spark actuator 30, can be configured to have different response times. Each could have a different associated torque input 18.

Figure 2:
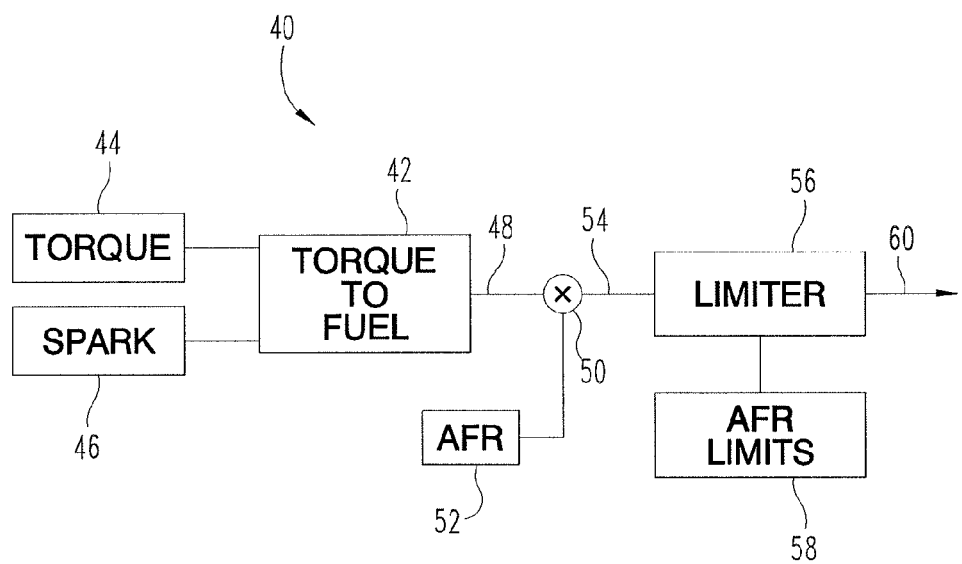
FIG. 2 is a block diagram of an example of an air control system according to an embodiment.

FIG. 2 is a block diagram of an example of an air control system according to an embodiment. In this embodiment, the air control 40 includes a torque to fuel conversion 42. The torque to fuel conversion 42 can be configured to convert a torque input 44 into a fuel signal 48. Other signals can be input to the torque to fuel conversion 42. In this embodiment, a spark signal 46 can be input to the torque to fuel conversion 42. The spark signal 46 can be an optimum spark signal, such as a maximum braking torque. In response, the torque to fuel conversion 42 can convert the torque signal 44 and spark signal 46 to the fuel signal 48. In an embodiment, the torque signal 44 can be the longer-term torque signal described above.

The fuel signal 48 can be multiplied with an AFR 52 in multiplier 50 to generate an air signal 54. AFR limits 56, such as emissions limits, operational limits, or the like, can be applied by limiter 56. For example, for a CI engine, a lower limit can be related to a smoke limit and an upper limit can be related to nitrogen oxide emissions. In another example, the AFR limit can be related to a stoichiometric AFR or other target AFR of an SI engine. Accordingly, the air signal 54 can be limited by such limits to generate the air control signal 60. The air control signal 60 is an example of the air control signal 20 described above.

As described above, different limits and/or sets of limits can be used on different engine types. That is, a CI engine can have an upper and lower AFR limit while an SI engine can have a stoichiometric or single target AFR limit. This change can reflect a difference between an SI engine and a CI engine. Thus, the control system can be applied with different engine types with such a parameter change while the underlying software, firmware, or the like need not change.

Figure 3:
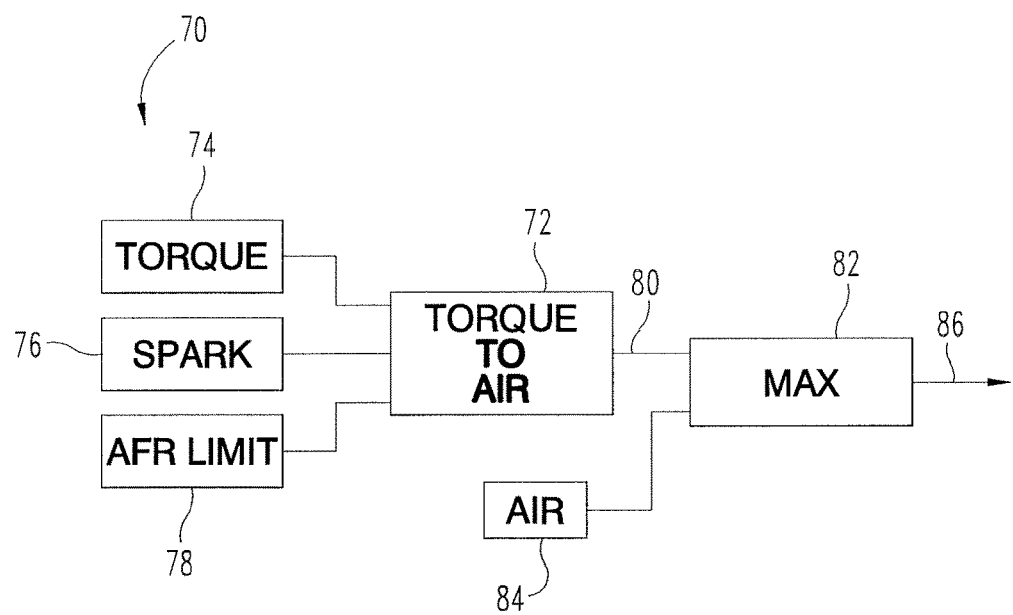
FIG. 3 is a block diagram of another example of an air control system according to an embodiment.

FIG. 3 is a block diagram of another example of an air control system according to an embodiment. In this embodiment, the air control 70 includes a torque to air converter 72. The torque to air converter 72 is configured to convert a torque signal 74, a spark signal 76, and an AFR limit signal 78 into an air signal 80. For example, a longer-term torque signal and an optimal spark signal can be converted into an intermediate air signal. The air signal can be limited by a lower limit AFR signal to generate the air signal 80. That is, an amount of air for a desired torque can be determined then limited by a lower AFR limit, for example a smoke limit.

The maximum 82 of the air signal 80 and a second air signal 84 can be used to generate air signal 86. The air signal 84 can be an input from other control systems, such as the fuel control 14, spark control 16, or the like. Accordingly, a longer-term normally lean mode of operation can be used. That is, a maximum of the desired air can be used so that additional margin can be present to operate the engine with a richer AFR, potentially without increasing the amount of air supplied to a cylinder.

The maximum air signal 86 can be used as the air control signal 20 described above to actuate the air actuator 26. However, in other embodiments, the maximum air signal 86 can be limited by AFR limits as in FIG. 2, such as by an upper AFR limit, or the like.

Figure 4:
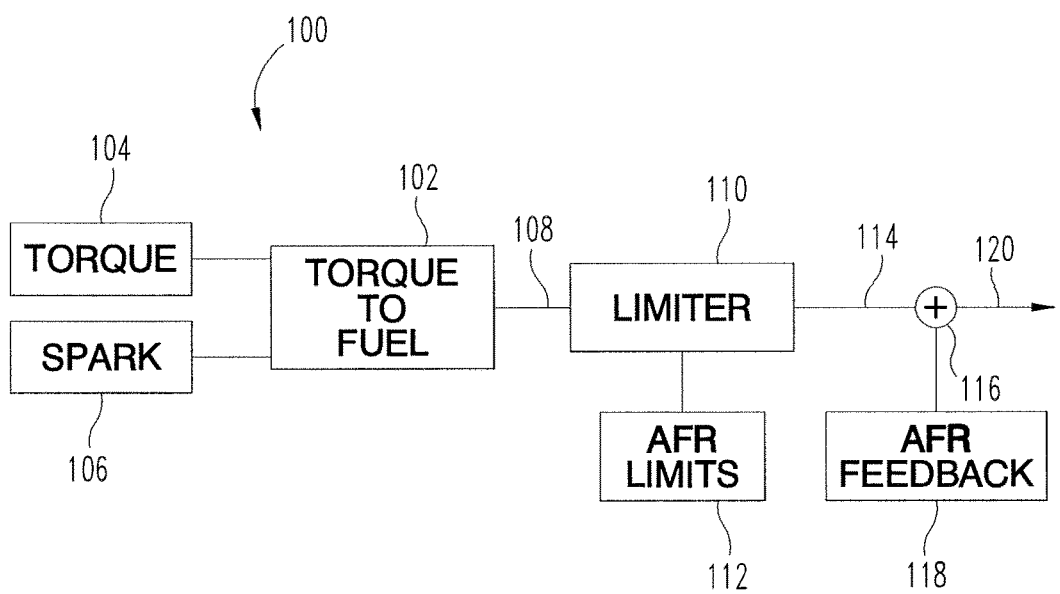
FIG. 4 is a block diagram of an example of a fuel control system according to an embodiment.

FIG. 4 is a block diagram of an example of a fuel control system according to an embodiment. In this embodiment, the fuel control 100 includes a torque to fuel converter 102. The torque to fuel converter 102 is configured to convert a torque signal 104 and a spark signal 106 into a fuel signal 108.

In particular, the fuel signal 108 can be a second fuel signal if used in conjunction with the air control 40 described above. Furthermore, the torque signal 104 can be an instantaneous torque signal as described above. That is, control signals of the fuel control 100 can be based on a different torque signal than the air control 40.

The fuel control signal 108 can be limited by limiter 110. The limits can be AFR limits 112. In an embodiment, the AFR limits 112 for the fuel can be formed from an AFR limit in an air-to-fuel ratio format and an estimated air signal. For example, for a given cycle of the fuel control 100, an estimated amount of air can be divided by one or more air-to-fuel ratios to generate the AFR limits 112 for the fuel signal 108. Accordingly, a limited fuel signal 114 can be generated. Similar to the air control 40 described above, the AFR limits 112 can be selected as appropriate to the type of engine.

The limited fuel signal 114 can be used as a setpoint for an AFR control loop. For example, an AFR feedback system 118 can provide feedback from an oxygen sensor. This can be combined appropriately in adder 116 to generate fuel control signal 120. The fuel control signal 120 can be used as the fuel control signal 22 described above.

Figure 5:
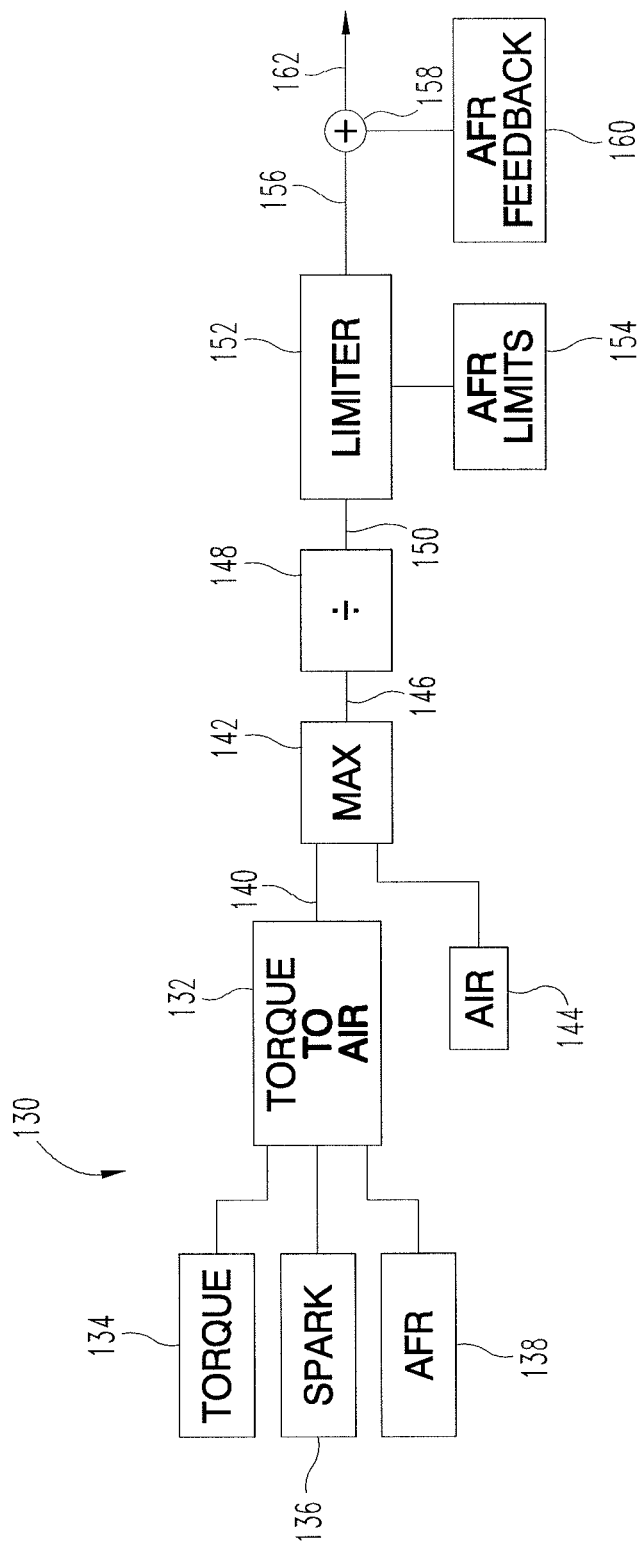
FIG. 5 is a block diagram of another example of a fuel control system according to an embodiment.

FIG. 5 is a block diagram of another example of a fuel control system according to an embodiment. In this embodiment, the fuel control 130 includes a torque to air converter 132. Similar to the torque to air converter 72, the torque to air converter 132 can be configured to convert a torque input 134, and a spark input 136 to an air signal 140. However, the torque to air converter 132 can also be configured to generate the air signal 140 in response to an AFR input 138. For example, the torque input 132 can be the instantaneous torque and the spark input 136 can be an optimal spark timing. In addition, the AFR input 138 can be a target AFR signal.

A maximum 142 of the air signal 140 and another air signal 144, such as an air signal 80 described above, can generate a maximum air signal 146. The maximum air signal 146 can be divided in 148 by the target AFR signal 138 to generate a fuel signal 150. The fuel signal 150 can be limited by limiter 152 and AFR limits 154 similar to FIG. 3 to generate a limited fuel signal 156. In addition, the limited fuel signal 156 can be an input to an AFR control system with AFR feedback 160 and adder 158 to generate the fuel control signal 162. The fuel control signal 162 can be used as the fuel control signal 22 described above.

Although various torque to fuel converters and torque to air converters have been described above using air-based signals or fuel-based signal, the character of the control signals can be implemented as desired. For example, the air control 20 can use air-based control signals while the fuel control 22 uses fuel-based control signals, or vice-versa.

Figure 6:
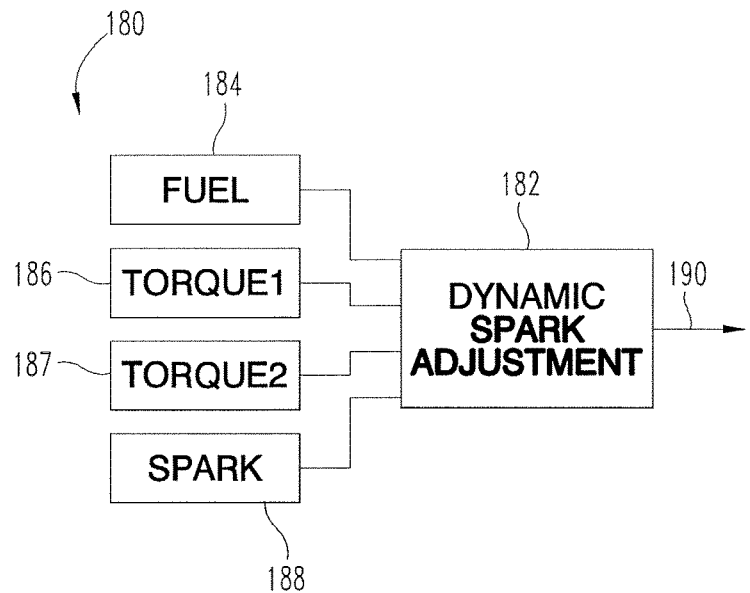
FIG. 6 is a block diagram of a spark control system according to an embodiment.

FIG. 6 is a block diagram of a spark control system according to an embodiment. In this embodiment, the spark control 180 can be configured to generate a spark control signal 190 in response to a fuel signal 184, torque signals 186 and 187, and a spark signal 188. For example, the fuel signal 184 can be a fuel signal 115, 156, or the like described above. The torque signals 186 and 187 can be the instantaneous torque and longer-term torque described above. From these signals, a spark control signal 190 can be generated.

Although a spark signal 188 has been described as an input, some engines may not use a spark input. For example, a CI engine may not have a spark input, let alone an optimal spark. Accordingly, such inputs can be ignored, may not be present, or the like when the control system is configured for a CI engine.

Figure 7:
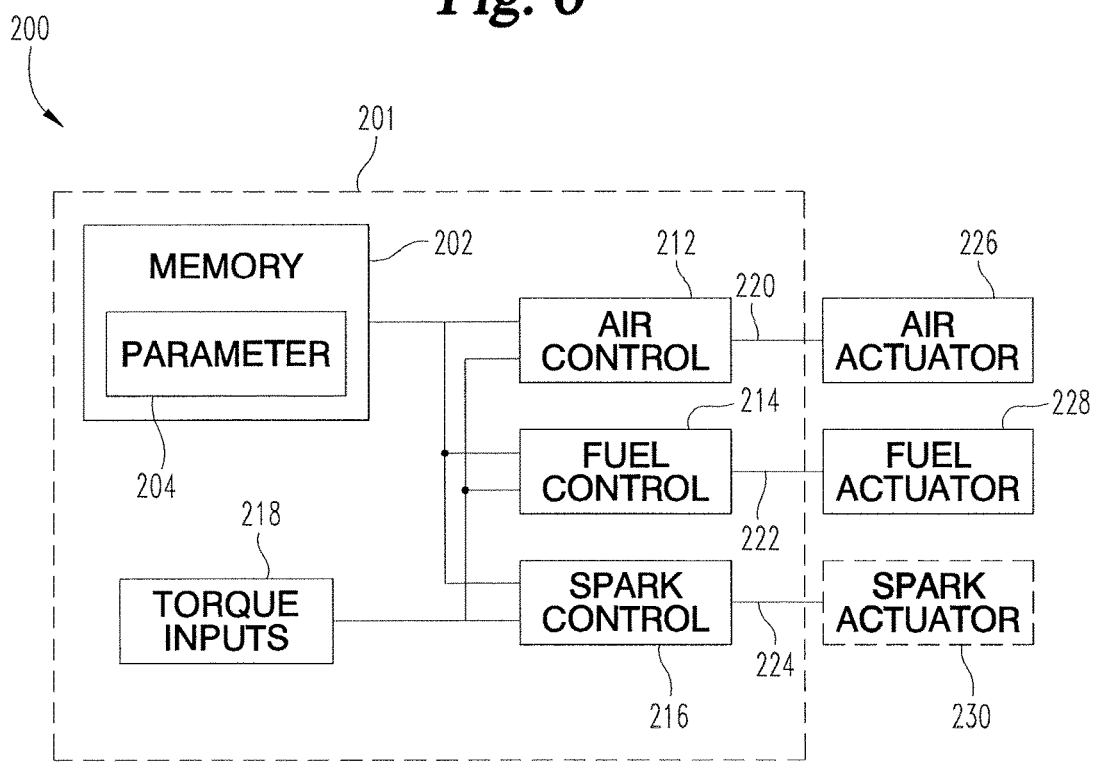
FIG. 7 is a block diagram of a torque based engine control system according to an embodiment.

FIG. 7 is a block diagram of a torque based engine control system according to an embodiment. In this embodiment, the engine control system 200 can include a controller 201 similar to controller 11 described above. That is, the controller 201 can include torque inputs 218, an air control 212, a fuel control 214, a spark control 216, and be configured to generate the associated control signals 220, 222, and 224 for actuators 226, 228, and 230.

However, the controller 201 can include a memory 202 configured to store a parameter 204. Although illustrated as part of the controller 201, the memory 202 can be separate from the controller 201, distributed between the controller 201 and external systems or the like. Furthermore, the memory 202 can be configured to store other code and/or data associated with the controller 201 or other control systems.

The controller 201 can be configured to control air and fuel delivered to an engine in response to the parameter 204. In particular, the engine can be controlled in a stoichiometric mode when the parameter has a first value and a lean mode when the parameter has a second value.

In particular, the parameter 204 can represent various aspects of the control system that can differ between CI and SI engines. As described above, CI engines and SI engines can have different AFR limits. The AFR limits are examples of the parameter. That is, if upper and lower AFR limits are substantially equal, the engine can be controlled in a stoichiometric mode and if the upper and lower AFR limits are unequal, the engine can be controlled in a lean mode.

Other parameters of the control system that can be the parameter 204 can include torque models used for the various torque to air or fuel converters and spark controls described above. That is, particular torque models can be used for an SI engine while different torque models can be used for a CI engine. A given torque model can be loaded into the memory 204 and cause the controller 201 to operate in a stoichiometric mode, a lean mode, or the like.

Although various types of parameters have been used as examples of the parameter 204, the parameter can be an abstract parameter. For example, the parameter 204 can be a flag, bit, register, or the like that can be set to indicate an operational mode. That is, once the parameter 204 is set, appropriate AFR limits, torque models, or the like can be selected and used during operation of the engine. As a result, common software, firmware, or the like can be used among multiple engine types by changing configurable parameters stored in the memory 202. Thus, multiple versions need not be maintained for multiple engine types.

Figure 8:
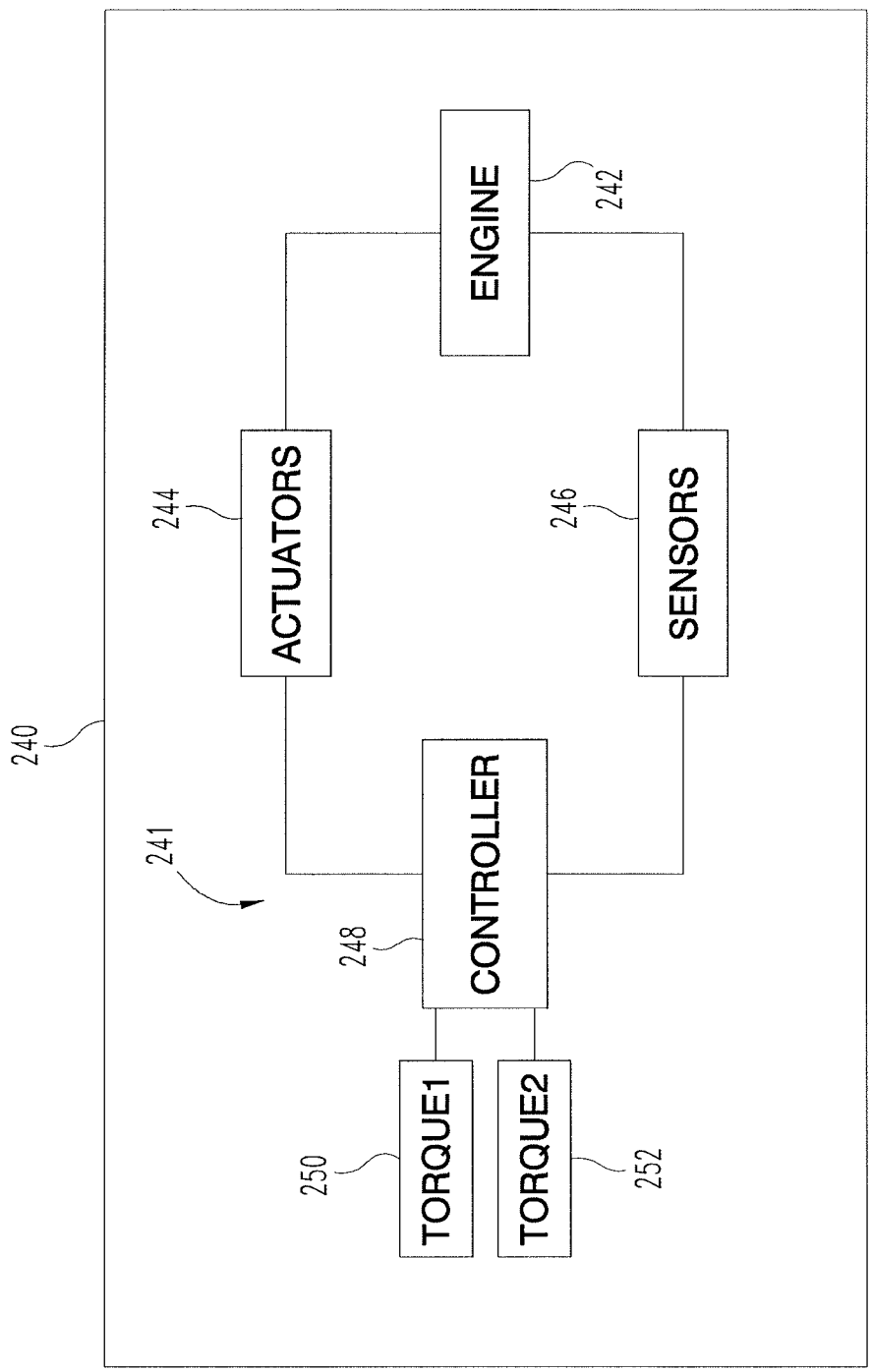
FIG. 8 is a block diagram of a vehicle with an engine system according to an embodiment.

FIG. 8 is a block diagram of a vehicle with an engine system according to an embodiment. In this embodiment, the vehicle 240 includes an engine system 241 configured to provide power for the vehicle 240. The engine system 241 includes a controller 248 coupled to actuators 244 and sensors 246 coupled to an engine 242. The controller 248 can be configured to implement the various air, fuel, and spark controls described above in response to torque inputs 250 and 252 from various other sources.

Furthermore, in an embodiment, the engine system 241 can, but need not directly provide locomotive power for the vehicle 240. For example, the engine system 241 can be configurable to drive an electric motor and/or generator.

Although a controller 248 has been described as performing the air, fuel, and spark control for an engine 242, the controller 248 can, but need not be dedicated for such function. That is, the controller 248 can be part of a larger engine management system, emissions control system, or the like. Furthermore, the functionality of the controller 248 can be spread across multiple devices, processors, subsystems, or the like.

The controller 248 can be implemented in a variety of ways. For example, the controller 248 can include a general purpose processor, a microcontroller, an application specific integrated circuit, a programmable logic device, a combination of such devices, or the like.

An embodiment includes a computer-readable medium storing computer-readable code that when executed on a computer, causes the computer to perform the various techniques described above. The computer-readable medium can also be configured to store various parameters described above. Thus, in an embodiment, the code can remain common across engine types, yet the parameters can be separately configurable and stored to create an engine-specific distribution.

Figure 9:
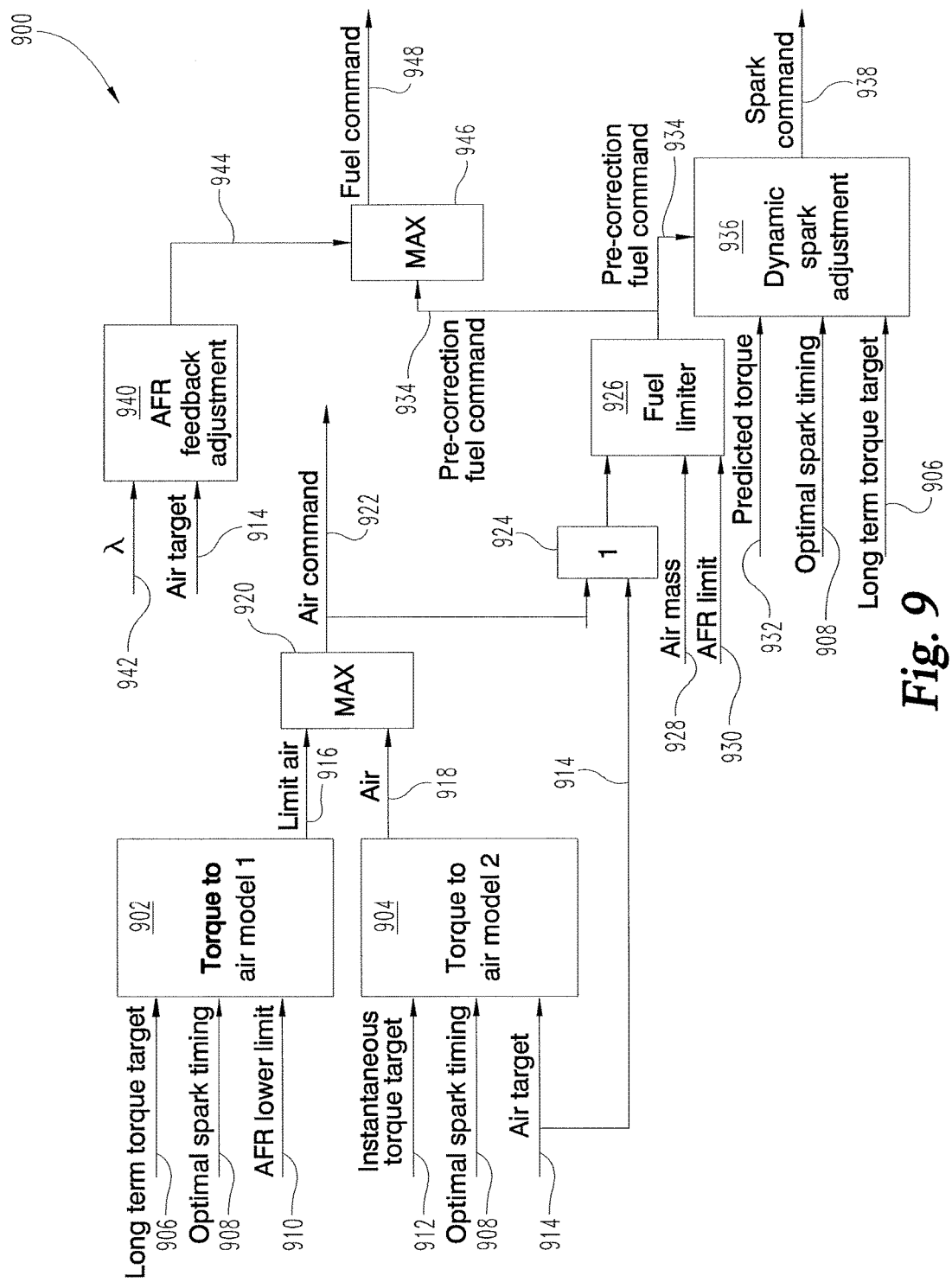
FIG. 9 is a schematic depiction of a controller utilizing multiple torque control schemes.

Referencing FIG. 9, a controller 900 utilizing multiple torque control schemes is depicted. The controller 900 is compatible with certain other system described herein, and can be utilized in whole or part in other systems. The controller 900 is a non-limiting example, and portions of the controller 900 and/or certain principles utilized by the controller 900 may be applicable to other systems described herein.

The description of controller 900 herein utilizes certain terms that may be similar to terms utilized in the descriptions referencing FIGS. 1 through 8. Where descriptions and utilizations of terms are not identical, it should be understood that the terms may be utilized as described in portions referencing FIGS. 1 through 8, as described in the portion referencing FIG. 9, and/or as any such terms may be understood by one of skill in the art, except where explicitly stated otherwise.

The controller 900 includes a first torque to air model 902. The first model 902 determines a limit air torque 916 in response to a long term torque target 906, an optimal spark timing 908, and an AFR (air-fuel-ratio) lower limit value 910. The long term torque target 906 is determined in response to the operating requirements of the system having the controller 900, and non-limiting examples include a torque value requested by an operator, a torque value required to achieve a desired speed or acceleration of an engine, and/or a torque value required to achieve a desired power output of an engine. The optimal spark timing is the timing desired by an overall control system, which may be determined for purposes of emissions, fuel economy, or other reasons. Optimal is described in reference to the desired timing outside the operations of the controller 900, and may be a range of timing values. "Optimal" for the optimal spark timing 908 is not limited to an optimal value for any particular consideration such as fuel economy, but simply as defined by a system outside the controller 900.

The AFR lower limit 910 may be determined from a minimum amount of air to support the long term torque target 906, from a minimum amount of air determined in response to an emissions requirement, by a minimum air flow desired at a turbocharger for responsiveness, or by any other determination. In certain embodiments, for example when the controller 900 is operating an engine utilizing compression ignition (CI) and/or other engine where stoichiometry is not enforced (e.g. a gasoline direct injected [GDI] or stratified combustion engine) the AFR lower limit 910 may be set out of the way (e.g. too low to impede the controls) and/or set to a value determined for purposes other than combustion limits. The first torque to air model 902 outputs a limit air value 916.

The controller 900 further includes a second torque to air model 904. The second model 904 operates utilizing an instantaneous torque target 912. The instantaneous torque target 912 is an intermediate torque target that is determined to be achievable in the short term by the system, and to bring the engine acceptably toward the long term torque target 906 over time. At certain operating conditions, such as but not limited to steady state operation, the instantaneous torque target 912 may be equivalent to the long term torque target 906. In certain embodiments, the instantaneous torque target 912 is determined in response to the limiting dynamics of an air handling system, which generally responds to transient operation more slowly than fueling (timing, fuel type, and/or amount), valve timing, or spark control operations. For example, many systems can change fuel timing and amount to a desired value quickly, and even with each individual fueling event. However, the time constant to air flow changes in response to a change in an intake valve, exhaust valve, variable geometry turbocharger position, or other air-handling actuator can be on the order of hundreds of milliseconds or even seconds.

The second model 904 further utilizes an air target 914, which may be a suitable air flow at the long term torque target 906, an air flow value determined in response to the instantaneous torque target 912, or another target air flow value determined in the system. A maximum element 920 provides an air command 922 consistent with the greater of the limit air 916 and the air value 918 determined by the second model 904.

The controller 900 includes a fuel limiter 926 that trims a fuel command in response to an output of a ratio element 924 providing the ratio of the air command 922 to the air target 914, and further in response to a current air mass 928 and an AFR limit 930. The current air mass 928 is a measured or estimated value for the actual air flow through the engine at the execution time of the fuel limiter 926. Any known technique to determine actual air flow is contemplated, and many techniques are known in the art. The AFR limit 930 may be the same or a different AFR limit 930 than the AFR lower limit 910, and may be determined for distinct purposes from the AFR lower limit 910. The AFR limit 930, in non-limiting examples, is provided to ensure stoichiometric combustion, to ensure that a particulate emissions level is not exceeded, and/or to provide for transient management ability by the controller 900 by avoiding very low air flow rates.

The fuel limiter 926 provides a pre-correction fuel command 934, which may be adjusted by an AFR feedback adjustment 940 control element. The AFR feedback adjustment 940 determines a current λ value 942, which may be estimated, calculated, and/or determined from a sensor (e.g. a wide band oxygen sensor, a $NO_x$ sensor, or other sensor). The AFR feedback adjustment 940 further determines the air target 914, and provides a correction 944 that adjusts the pre-correction fuel command 934 to the fuel command 948. The adjustment is depicted as an additive amount in the sum element 946. However, the fuel adjustment may be provided by any method, including at least by a multiplier, an enforced minimum and/or maximum, and/or from a look-up table or more complex function. The AFR feedback adjustment 940 ensures that the fuel command 948 will achieve proper combustion based upon the air actually present, and/or may serve other purposes in the system such as enforcing a target AFR amount for aftertreatment devices or other purposes.

The controller 900 further includes a dynamic spark adjustment 936 that provides a spark command 938. The dynamic spark adjustment 936 determines a predicted torque 932, which is the torque value expected from the fuel command 948 and the air command 922 at the current system conditions, and/or may be the torque value expected from the pre-correction fuel command 934 and the air command 922 (as shown in the example of FIG. 9). The dynamic spark adjustment 936 also determines the optimal spark timing 908 and the long term torque target 906, and provides the spark command 938. In one example, the dynamic spark adjustment 936 provides a spark command 938 that will provide an actual torque output of the engine that achieves the long term torque target 906, and/or that is closer to the long term torque target 906 than the predicted torque 932. The dynamic spark adjustment 936 may limit the spark command 938 to values supported by emissions determinations, and/or to values within a range of values provided by the optimal spark timing 908.

The control architecture of the controller 900 can support torque determination, and fueling and air handling command determination, for a spark ignition engine, a compression ignition engine, for other engines that are not limited to stoichiometric operation (e.g. GDI, homogenous, or stratified combustion engines), through simple manipulation of calibrations within a control scheme. An example includes operating a SI engine by setting the AFR lower limit 910 and the air target 914 to the stoichiometric air value (or upper and lower limits within a range of values near stoichiometric) at the target torque value, thereby operating the engine acceptably for stoichiometric operation and controlling torque with the air command. An example includes opening the AFR lower limit 910 and air target 914 values for a CI engine such that fueling is utilized to control the torque. The controller 900 further allows for rapid torque management utilizing spark manipulation to improve transient control of engines managing torque control with air which is generally a slower responding system.

The controller 900 can be utilized to control a single engine having multiple fueling schemes. The controller 900 can be utilized to provide a single control scheme for multiple engine families, with just a calibration difference to provide the various fueling schemes. The utilization of a single controller 900 for multiple engine families provides for manufacturing cost savings and simplification. The controller 900 further supports changing of a fuel system after the engine is manufactured, for example with a conversion to another type of fuel and/or support for a dual fuel system (e.g. adding natural gas capability to an engine after manufacture), where a simple calibration update is much less intrusive and cheaper to implement than a computer replacement or firmware replacement.

The schematic flow descriptions which follow provides an illustrative embodiment of performing procedures for controlling engines with multiple torque delivery schemes with a single controller and/or a single implementation scheme of a controller. Operations illustrated are understood to be exemplary only, and operations may be combined or divided, and added or removed, as well as re-ordered in whole or part, unless stated explicitly to the contrary herein. Certain operations illustrated may be implemented by a computer executing a computer program product on a non-transient computer readable storage medium, where the computer program product comprises instructions causing the computer to execute one or more of the operations, or to issue commands to other devices to execute one or more of the operations.

An operation includes providing a controller, such as any controller described herein including controller 900, and operating an engine by controlling torque with air at a first operating condition, and operating the engine by controlling torque with fuel at a second operating condition.

An operation includes providing a controller, such as any controller described herein including controller 900, and providing a first copy of the controller to a first engine that controls torque with air, and providing a second copy of the controller to a second engine that controls torque with fuel.

An operation includes providing a controller, such as any controller described herein including controller 900, and operating an engine with the controller to control torque with one of air and fuel. The operation further includes, at a time after the manufacture of the engine, switching the control of torque in the engine to the other one of air and fuel.

An operation includes providing a controller, such as any controller described herein including controller 900, and operating an engine with a first fuel type, and the controller controlling the torque of the engine with one of air and fuel in response to the first fuel type. The operation further includes performing at least one of adding a second fuel type to the engine (e.g. as a dual fuel capable engine) and/or switching the engine to a second fuel type, and where the controller, in response to the second type of fuel being utilized, controls torque by the other of the air and fuel from the first type of fuel.

While the invention has been illustrated and described in detail in the drawings and foregoing description, the same is to be considered as illustrative and not restrictive in character, it being understood that only certain exemplary embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A system, comprising:
a memory configured to store a parameter;
a controller coupled to the memory and configured to control air and fuel delivered to an engine in response to the parameter such that the engine is controlled in a stoichiometric mode when the parameter has a first value and a lean mode when the parameter has a second value,
wherein the parameter comprises at least one air-to-fuel ratio limit wherein:
the at least one air-to-fuel ratio limit includes an upper air-to-fuel ratio limit and a lower air-to-fuel ratio limit; and
the upper air-to-fuel ratio limit is different from the lower air-to-fuel ratio limit in the lean mode.

2. The system of claim 1, wherein the upper air-to-fuel ratio limit is equal to the lower air-to-fuel ratio limit in the stoichiometric mode.

3. A system, comprising:
a memory configured to store a parameter;
a controller coupled to the memory and configured to control air and fuel delivered to an engine in response to the parameter such that the engine is controlled in a stoichiometric mode when the parameter has a first value and a lean mode when the parameter has a second value, wherein
for the stoichiometric mode the parameter includes an air-to-fuel ratio lower limit and an air target that are set to stoichiometric air values, and
for the lean mode the parameter includes an open air-to-fuel ratio lower limit and air target,
wherein for the lean mode the parameter further includes an upper air-to-fuel ratio limit and the upper air-to-fuel ratio limit is different from the open lower air-to-fuel ratio lower limit.

4. The system of claim 3, wherein the controller is configured to control an engine torque of the engine, wherein the controller is further configured to actuate an air actuator of a spark ignition engine in the stoichiometric mode to control the engine torque, and the controller is further configured to actuate a fuel actuator of one of a compression ignition engine and a direct gasoline injection engine in response to the lean mode to control the engine torque.

5. The system of claim 4, wherein the controller is configured to determine a type of the engine is one of the spark ignition engine, the compression ignition engine, and the direct gasoline injection engine and, after determining the type of the engine, control the engine torque by operating the corresponding one of the air actuator in response to the stoichiometric mode and the fuel actuator in response to the lean mode.

6. The system of claim 5, wherein the controller is configured to switch controlling the engine torque by operating the other of the air actuator and the fuel actuator in response to determining the type of the engine has changed.

7. The system of claim 5, wherein the controller is configured to determine the type of engine in response to a fuel type.

* * * * *